US008156018B1

(12) United States Patent  
Quinn et al.

(10) Patent No.: US 8,156,018 B1
(45) Date of Patent: Apr. 10, 2012

(54) TRANSFORMATION OF STANDARD DOCUMENT FORMAT ELECTRONIC DOCUMENTS FOR ELECTRONIC FILING

(75) Inventors: Christopher N. Quinn, Del Mar, CA (US); Anthony L. Creed, San Diego, CA (US); Kenichi Mori, Carlsbad, CA (US); Justin C. Marr, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1045 days.

(21) Appl. No.: 11/612,253

(22) Filed: Dec. 18, 2006

(51) Int. Cl.  
*G06F 17/22* (2006.01)  
*G06Q 20/00* (2012.01)
(52) U.S. Cl. ............................ 705/31; 705/19
(58) Field of Classification Search .................. None  
See application file for complete search history.

(56) References Cited

U.S. PATENT DOCUMENTS

| | | | |
|---|---|---|---|
| 5,299,304 A | 3/1994 | Williams et al. | |
| 5,491,628 A | 2/1996 | Wakayama et al. | |
| 5,608,874 A | 3/1997 | Ogawa et al. | |
| 6,043,819 A | 3/2000 | LeBrun et al. | |
| 6,202,052 B1* | 3/2001 | Miller | 705/31 |
| 6,336,124 B1 | 1/2002 | Alam et al. | |
| 6,401,079 B1* | 6/2002 | Kahn et al. | 705/30 |
| 6,697,787 B1 | 2/2004 | Miller | |
| 7,296,221 B1* | 11/2007 | Treibach-Heck et al. | 715/224 |
| 2002/0194227 A1 | 12/2002 | Day et al. | |
| 2004/0205533 A1* | 10/2004 | Lopata et al. | 715/507 |
| 2005/0060234 A1* | 3/2005 | Reahard | 705/19 |
| 2005/0251733 A1* | 11/2005 | Elkady | 715/503 |
| 2006/0085306 A1* | 4/2006 | Schulte et al. | 705/31 |
| 2006/0155618 A1* | 7/2006 | Wyle | 705/31 |
| 2006/0282354 A1* | 12/2006 | Varghese | 705/32 |

OTHER PUBLICATIONS http://web.archive.org/web/20031205025057/www.irs.gov/formspubs/.*  
"Electronic Filing (E-File) Income Tax Return FAQs,"TurboTax, 1997-2006 Intuit, Inc., printed from http://turbotax.intuit.com/tax_help/electronic_tax_filing_e_file_faq/a... on Nov. 28, 2006, 3 pages.

* cited by examiner

Primary Examiner — Ryan Zeender  
Assistant Examiner — Dana Amsdell  
(74) Attorney, Agent, or Firm — Osha • Liang LLP (57) ABSTRACT

An electronic filing system may receive electronic documents including a completed tax return. The electronic documents may be of a standard document presentation format such as Portable Document Format. The electronic filing system may parse the completed tax return and create transmittable data that includes the completed tax return. The transmittable data may be of a format that is accepted by a taxing authority and different than the original format. The transmittable data may be transmitted to the taxing authority for electronic filing of the completed tax return. The electronic filing system may check for tax return errors before transmitting the transmittable data. The electronic filing system may enable the user to correct errors before transmitting the transmittable data as well as receiving additional error notifications from the taxing authority. The electronic filing system may notify the user of such errors and enable the user to correct the errors.

34 Claims, 5 Drawing Sheets

TRANSFORMATION OF STANDARD DOCUMENT FORMAT ELECTRONIC DOCUMENTS FOR ELECTRONIC FILING

BACKGROUND

Typically, a user (e.g., a taxpayer) may use a tax return preparation application to prepare a tax return for electronic filing with a taxing authority. Instead of manually completing a tax return form (e.g., by pen and paper), the user may answer a series of questions presented by the tax return preparation application. The tax return preparation application may use the answers provided by the user to prepare the tax return. Once prepared, the tax return may be sent to an electronic filing system for electronically filing with a taxing authority. Electronically filing a tax return prepared by a tax return preparation application may result in less filing errors than a tax return that is prepared by manually completing a tax return form and mailing the form to the taxing authority. Furthermore, a taxing authority may provide tax refunds in a timelier manner when a user files a tax return electronically.

Alternatively, a user may prepare and file a tax return by manually completing a tax return form issued by a taxing authority (e.g., Form 1040 issued by the Internal Revenue Service) and mailing the tax return form along with any necessary supporting documents (e.g., Form W-2) to the taxing authority. For example, the user may manually complete a hardcopy version of the tax return form by writing the necessary tax return information into the appropriate fields of the hardcopy tax return form and mailing the form along with any necessary supporting documents to a taxing authority. If any errors are present within the tax return form or supporting documents, the taxing authority may notify the user of the errors at a later date. If a tax refund is due, the refund is typically mailed to an address or electronically deposited to a bank account designated by the user. Additionally, the presence of errors within the tax return form or supporting documents delays the processing of any tax refund due.

Instead of manually completing a hardcopy version of the tax return form (e.g., by writing in the necessary information), the user may complete an electronic version of the tax return form of a standard document presentation format such as Portable Document Format (PDF), Microsoft Word document format, StarOffice document format, or any other format of an application providing standard document viewing and/or editing capabilities such as an image file format or word processing file format. To complete an electronic version of the tax return, the user may enter (e.g., type) the necessary tax return information into the appropriate fields. For example, the user may enter tax return information into the appropriate fields of a PDF tax return form and subsequently save the file. Alternatively, the user may use a tax form preparation application to complete the electronic version of the tax return form. For example, the tax form preparation application may prompt the user with a series of question related to various tax items. Subsequently, the tax form preparation application may create a completed electronic version of the tax return form in a standard document presentation format. For instance, the tax form preparation application may create a completed tax return form in PDF or Microsoft Word document format. A standard document presentation format is a format in which a document in that format can be displayed and/or edited as a document by a standard word processing or display application, such as Microsoft Word® or Adobe Acrobat®.

While creating the tax return form in a standard document presentation format may be more convenient than hand writing the form, the user may nevertheless be required to print a hardcopy of the tax return and mail the tax return (along with any supporting documents) to the taxing authority in order to complete the filing of the tax return. In other words, the filing of a tax return including a tax return form of a standard document presentation format may be no different than the filing of a tax return including a written hardcopy tax return form as described above. Existing electronic filing solutions do not and cannot electronically file tax returns to a taxing authority in a standard document presentation format. Since an electronic filing system and/or taxing authority may not be capable of processing tax returns including documents of a standard document presentation format, users choosing to prepare their tax returns in this manner may not be able to realize the benefits associated with electronic filing.

SUMMARY

An electronic filing system may receive electronic documents including a completed tax return. The format of the electronic documents may be a standard document presentation format such as Portable Document Format (PDF). The electronic documents may include a tax return form (e.g., IRS Form 1040) and supplementary documents required by a taxing authority for the filing of a tax return such as a wage and tax statement (e.g., Form W-2). In some embodiments, the user may complete a form-fillable file, such as a form-fillable PDF tax return form, by entering information and/or data into fields of the file. The form-fillable file may retain the user's entries when saved electronically. In other embodiments, the user may complete a hardcopy (e.g., paper copy of Form 1040) tax return form by handwriting information and/or data on the form. Subsequently, the user may electronically scan the completed hardcopy tax return form to create an electronic document. Similarly, in some embodiments, the user may scan a hardcopy of a supplementary document required by a taxing authority for the filing of a tax return to create an electronic document.

After receiving the electronic documents including documents of a standard document presentation format, the electronic filing system may parse the completed tax return and create transmittable data that includes the completed tax return. In some embodiments, the electronic documents may include one or more image files, and thus the electronic filing system may parse the electronic documents by utilizing optical character recognition (OCR) to extract data and/or information pertaining to the tax return. The format of the transmittable data may be a format that is accepted by a taxing authority and different than the original format of the completed tax return (e.g., PDF). The transmittable data may be transmitted to the taxing authority for electronic filing of the completed tax return. In some embodiments, if the electronic documents do not contain sufficient data and/or information for electronic filing, the electronic filing service may prompt the user for additional information necessary for the proper filing of an electronic tax return such as a personal identification number (PIN) or an adjusted gross income from a previous year's tax return.

In some embodiments, the transmittable data is created and/or transmitted to the taxing authority according to a format accepted by the taxing authority. In one embodiment, the transmittable data may be one or more electronic data interchange (EDI) documents transmitted to the taxing authority according to an EDI standard. In other embodiments, the transmittable data may be written in the extensible markup language (XML) and according to a particular XML schema specified by the taxing authority.

The electronic filing system may check for errors in the completed tax return before transmitting the transmittable data to the taxing authority. Additionally, in some embodiments, the electronic filing system may enable a user to correct errors through a user interface before transmitting the transmittable data. After transmitting the transmittable data, the electronic filing system may receive error notifications from the taxing authority in regard to the transmitted data (including the completed tax return). The electronic filing system may notify the user of such errors and enable the user to correct the errors through a user interface and resubmit the transmittable data for electronic filing with the taxing authority.

While the electronic filing system is described herein by way of example for several embodiments and illustrative drawings, those skilled in the art will recognize that the electronic filing system is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the electronic filing system as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

An electronic filing system may receive electronic documents that include a completed tax return of a user in a standard document presentation format, and electronically file the completed tax return with an appropriate taxing authority. For example, a user may complete a tax return form (e.g., IRS Forms 1040, 1040A, 1040EZ, or any other form necessary for the completion of a tax return) of a standard document presentation format (e.g., Portable Document Format or Microsoft Word format) and subsequently provide the form to the electronic filing system. The electronic filing system may parse the data included in the form in order to submit the user's completed tax return to the taxing authority according to a specific format accepted by the taxing authority.

Figure 1:
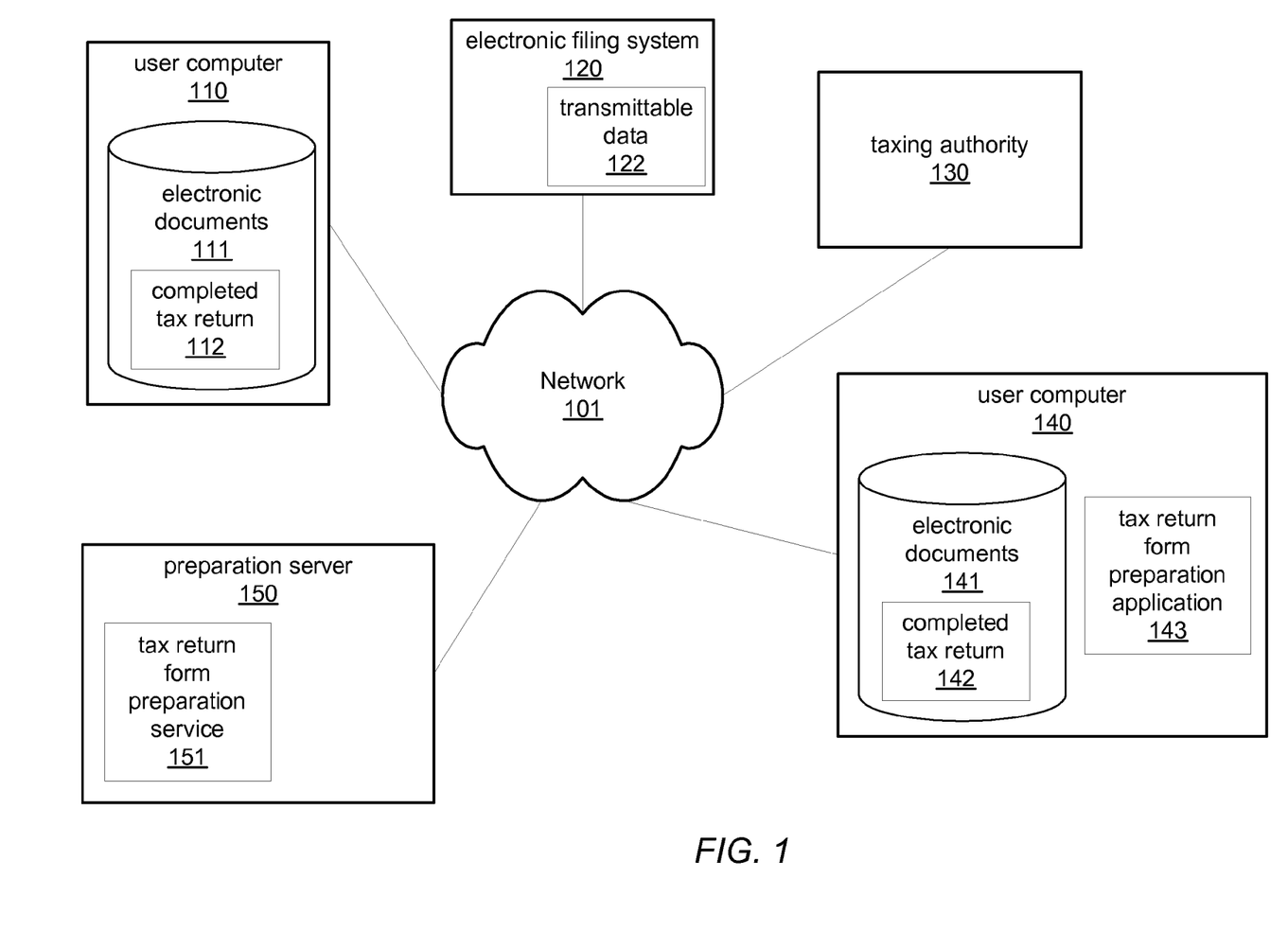
FIG. 1 is a block diagram illustrating one embodiment of an electronic filing system, as described herein.

FIG. 1 illustrates a system including an electronic filing system 120. Electronic filing system 120 may be configured to communicate with various user computers over network 101 such as user computer 110 and user computer 140. Additionally, the electronic filing system may communicate with taxing authority 130 and preparation server 150 over network 101.

In one embodiment, a document of completed tax return 112 may include a user-completed tax return form such as IRS Forms 1040, 1040A, 1040EZ, or any other user-completed form issued by a taxing authority for the filing of tax returns. In some embodiments, in addition to user-completed tax return forms, the completed tax return 112 may include additional or supplementary electronic documents required by a taxing authority for filing a tax return such as a wage and tax statement (e.g., IRS Form W-2), a statement of interest paid (e.g., IRS Form 1099-INT), or any other document required by a taxing authority in order to file a tax return. The electronic documents of completed tax return 112 may have various formats including a standard document presentation format such as Portable Document Format (PDF), Microsoft Word format, or an image format (e.g., JPEG, GIF, PNG, or BMP). The electronic documents included in completed tax return 112 may be of different types and formats. For example, completed tax return 112 may include multiple electronic documents including a tax return form (e.g., Form 1040) in PDF format and a wage and tax statement (e.g., Form W-2) in an image file format (e.g., JPEG). In one embodiment, completed tax return 112 may include a collection of one or more electronic documents 111 on user computer 110. In other embodiments, completed tax return 112 may be included in a single file such as compressed file (e.g. ZIP or RAR file).

As described above, in one embodiment, a format of an electronic document of the completed tax return 112 may be PDF. For example, an electronic document of the completed tax return 112 may be a PDF file such as a native PDF file (typically keyword searchable) or an image PDF file (typically not keyword searchable). For example, completed tax return 112 may include a PDF file retrieved from a website of taxing authority 130. In one embodiment, the PDF file may be a form-fillable file. For example, the-fillable PDF file may include text fields in which a user may enter information and/or data pertaining to a tax return such as a name, social security number, wages or salaries, taxable interest, dependents or any other item relevant to the filing of a tax return. Once a user has entered the appropriate information, the form-fillable PDF file may be saved in a manner that retains the entries of the user.

In some embodiments, an electronic document of the completed tax return 112 may be an image file (e.g., JPEG, GIF, PNG, or BMP). For instance, a user may scan a hardcopy (e.g. a paper copy) of a tax return document to create the image file. Scanning may include any method of creating a digital version of an analog document such as utilizing a flatbed or sheetfed document (or image) scanner. In one embodiment, the completed tax return 112 includes an image file of a form completed by handwriting. For example, a user may complete a hardcopy of a tax return form by handwriting the appropriate information and/or data in the respective sections (or fields) of the document. Once the user completes handwriting the tax return form, the user may scan the document to create an electronic version of the completed hardcopy form. The format of the electronic version of the completed hardcopy form may be any standard image format (e.g., JPEG, BMP, PNG or GIF) or a format such as PDF. In other embodiments, the user may create an electronic version of a supplementary document that does not require completion by a user, such as a wage and tax statement (e.g., a Form W-2) or any other form typically completed by an employer, by scanning the supplementary document to create an image file.

In one embodiment, user computer 140 may include tax return form preparation application 143. For instance, the tax return form preparation application may present to a user of user computer 140 a series of questions related to the completion of a tax return form (e.g., Form 1040) issued by a taxing authority for the completion of a tax return. After receiving answers to the questions from the user, the tax preparation application may create electronic documents including a completed tax return form (e.g. a completed PDF Form 1040). The completed tax return form may have a format such as PDF, an image file format, or any of the formats described above in regard to completed tax return 112. Furthermore, to create completed tax return 142, a user may combine the completed tax return form with additional electronic documents such as a wage and tax statement (e.g., IRS Form W-2), a statement of interest paid (e.g., IRS Form 1099-INT), or any other document required by a taxing authority in order to file a tax return. In other words, completed tax return 142 may be similar in composition to completed tax return 112 while having different methods of creation. For example, completed tax return 112 may include electronic documents including a completed tax return form (e.g., Form 1040) and an additional document such as a wage and tax statement (e.g. Form W-2). Additionally, completed tax return form 142 may include the same electronic documents as completed tax return 112. However, in this example, electronic documents of completed tax return 112 may have been completed directly by the user (e.g., a manually completed form-fillable PDF Form 1040) whereas electronic documents of completed tax return 142 may have been completed with the use of a tax return form preparation application such as tax return form preparation application 143. Please note, user computer 140 is provided as an alternative embodiment of user computer 110. Thus, the embodiments described herein as applied to completed tax return 112 also apply to completed tax return 142.

Additionally, preparation server 150 may include a tax return form preparation service 151 that provides the same functionality as the tax return form preparation application 143 as described above. In other words, in one embodiment, instead of using tax return form preparation application 143, a user may remotely access tax return form preparation service 151 from user computer 140 to create a completed tax return form in a standard document presentation format (e.g. a completed PDF Form 1040). Preparation server 150 may be configured to transmit the completed tax return form to user computer 140. Furthermore, to create completed tax return 142, a user may combine the completed tax return form with additional electronic documents such as a wage and tax statement (e.g., IRS Form W-2), a statement of interest paid (e.g., IRS Form 1099-INT), or any other document required by a taxing authority in order to file a tax return. In other embodiments, preparation server 150 may create the completed tax return 142 from the completed tax return form and additional electronic documents from the user. For example, preparation server 150 may request supplementary documents from the user such as a Form W-2 or another document required to file a tax return. Thus, preparation server 150 may transmit the completed tax return, including the tax return form in a standard document presentation format and any supplementary document, to electronic filing system 120 for electronic filing. In other embodiments, the user may be responsible for submitting the tax return to the electronic filing system from a user computer such as user computer 140.

Thus, the user may prepare a completed tax return including documents of a standard document presentation format by utilizing any of various techniques, including those described above. However, taxing authorities such as taxing authority 130 typically do not accept documents of a standard document presentation format for electronic filing. Thus, once the user has obtained or created an electronic tax return including documents of a standard document presentation format, the user may not be able to electronically file the tax return with a taxing authority. Typically, the user would need to create a hardcopy (e.g., by printing) of the electronic tax return and submit (e.g., by mail) the hardcopy of the tax return to the taxing authority.

Alternatively, the user may submit the completed tax return including documents of a standard document presentation format to electronic filing system 120. Thus, the completed tax return 112 may be provided to electronic filing system 120 over network 101. In one embodiment, network 101 may represent the Internet, and items coupled to network 101 may be configured to communicate with other items over the Internet. In some embodiments, network 101 may represent a wide area network (WAN), or a local area network (LAN) or corporate network such as an Ethernet network. In other embodiments network 101 may represent a combination of WANs, LANs, or the Internet. In one embodiment, network 101 may represent separate and distinct networks such that each item coupled to network 101 in FIG. 1 may be coupled to electronic filing system 120 through different networks. For example, user computer 110 may communicate with electronic filing system 120 over the Internet whereas taxing authority 130 may communicate with electronic filing system 120 over a private WAN.

After receiving the completed tax return 112, electronic filing system 120 may parse the completed tax return 112 to extract relevant information and data. In one embodiment, electronic filing system 120 may check for numerous errors within completed tax return 112 and allow a user to correct the errors. Details of various error-checking and correction methods that may be performed by electronic filing system 120 are described below and in the description of FIG. 3. Additionally, the electronic filing system may create transmittable data 122 from the parsed data of completed tax return 112 and according to an electronic filing format accepted by taxing authority 130 as described below. While the formats of each may differ, completed tax return 112 and transmittable data 122 may represent the same completed tax return in the abstract sense. For example, transmittable data 122 and completed tax return 112 may include the same tax return information and/or data. In other words, the content may be the same (with the exception of any error corrections, as describe below) while the structure or formats may differ.

As described above, taxing authorities such as taxing authority 130 typically do not accept completed tax returns including documents of a standard document presentation format. Thus, electronic filing system 120 may format the completed tax return to meet requirements for tax return submission of taxing authority 130. Taxing authority 130 may be a taxing authority of various entities such as federal, state, city, or foreign governments. The taxing authorities may have various requirements for electronic filing. For instance, taxing authority 130 may require that tax returns be submitted or transmitted according to a particular format or protocol. For example, in one embodiment, taxing authority 130 may require that transmittable data 122 be an Electronic Data Interchange (EDI) document. Thus, electronic filing system 120 and taxing authority 130 may be configured to transmit and receive EDI documents according to an EDI standard.

Additionally, taxing authority 130 may require that transmittable data 122 be created and or transmitted according to a particular EDI schema. Thus, electronic filing system 120 may be configured to create and/or transmit transmittable data 122 according to a particular EDI schema. In another embodiment, taxing authority 130 may require that transmittable data 122 be created according to a general-purpose markup language such as the extensible markup language (XML). Additionally, taxing authority 130 may require that transmittable data 122 be created and/or transmitted according to a particular schema of the general-purpose markup language such as an XML schema. In other embodiments, taxing authority 130 may provide a selection of multiple electronic filing formats and electronic filing system 120 may be configured to select one of the electronic filing formats in which to create and transmit transmittable data 122. In another embodiment, taxing authority 130 may accept only one type of electronic filing format for the electronic filing of tax returns.

In one embodiment, electronic filing system 120 may incorporate error corrections into transmittable data 122. For example, electronic filing system 120 may include a user interface for prompting a user with error notifications associated with errors detected within the tax return. Common errors may include a missing entry, mathematical error, incorrect number format or another tax return error that may be detected before electronically filing the tax return. Other detectable errors may include inconsistencies among fields. For example, a user may indicate on a tax return form that their filing status is "single" in addition to presenting an identification number (e.g., social security number) for a joint filer. Thus, the electronic filing system may detect that there is an inconsistency with either the filing status or the indication of a joint filer's identification number. In response to an error notification, the user may provide an error correction to the electronic filing system through the user interface. In other embodiments, the user may correct completed tax return 112 to create a corrected version of completed tax return 112. For example, the user may repeat the preparation of completed tax return with the correct tax related information. Subsequently, the user may provide the corrected version of completed tax return 112 to electronic filing system 120.

Figure 2:
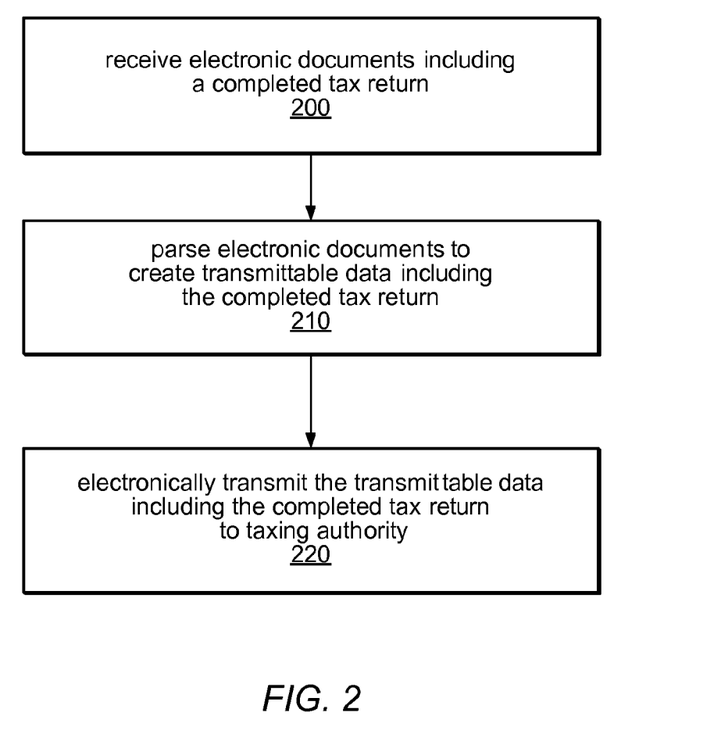
FIG. 2 is a flowchart illustrating one embodiment of a method for electronically filing a completed tax return, as described herein.

Referring now to FIG. 2, one embodiment of a method for electronically filing a tax return is illustrated. The method may be performed by the electronic filing service 120 of FIG. 1. As illustrated by block 200, the method may include receiving electronic documents that include a completed tax return. Additionally, the format of one or more of the electronic documents may be a standard document presentation format such as PDF. The electronic documents may be received through various communication channels such as network 101. For example, a user may utilize a feature of a tax return form preparation application such as tax return form preparation application 143 to transmit the electronic documents to electronic filing system 120. In another embodiment, electronic filing system 120 may receive the electronic documents in an email sent by the user. In other embodiments, the user may upload the electronic documents to an ftp server of the electronic filing system. In yet another embodiment, receiving the electronic documents may include sending a prompt to submit the electronic documents to a user and subsequently receiving a response, including the electronic documents, from the user. In general, receiving the electronic documents including the completed tax return may include any of various techniques for receiving electronic files.

As illustrated by block 210, the electronic documents may be parsed to extract relevant information and data from the completed tax return. The method of parsing maybe any of various parsing techniques including running an application, script or process configured to extract relevant information from the electronic documents (including documents of a standard document presentation format). In general, the format of an electronic document may determine what parsing method is appropriate for the document. For instance, in one embodiment, the completed tax return may be a collection of PDF documents. Thus, the parsing technique employed may include an application, script or process configured to extract information from PDF documents. For example, the application, script or process may be configured to isolate user-fillable fields of a PDF document and extract any data or information entered in those fields. In further example, the PDF document may be an image based PDF document such as an optically scanned hardcopy tax return form. Thus, the parsing application, script, or process may be configured to use OCR to extract data from the image based PDF file. In another embodiment, the completed tax return may be a collection of image documents (e.g., JPG, BMP, GIF, PNG files). For example, if an electronic document were an image file (e.g., a BMP file) of a hardcopy tax return form, the parsing application, script or process may be configured to extract data from the image file (e.g., using OCR). In one embodiment, the electronic documents may be included in a single compressed file (e.g., ZIP or RAR). Thus, the parsing application, script or process may be configured to parse compressed files for relevant tax related information. In some embodiments, as part of parsing the electronic documents, the electronic documents are checked for numerous errors (e.g., incorrect entries, missing entries, and inconsistencies among fields) and the documents are corrected by the user. Additionally, the corrections are incorporated into the transmittable data that is transmitted to the taxing authority. Details of the various error-checking and correction methods that may be performed are described in the description of FIG. 3.

In some embodiments, once the necessary tax related information is parsed from the electronic documents, the information may be stored in a data structure for internal use such as the internal use of electronic filing system 120. In other words, the data structure may facilitate any future manipulation or formatting of the parsed data. In general, this data structure may be used primarily for internal access and manipulation of the data (e.g., by electronic filing system 120) and may not be directly submitted to the taxing authority for electronic filing. For example, when the transmittable data is created (described below), the data structure may be accessed to retrieve the necessary tax related information parsed from the electronic documents.

In one embodiment, the data structure is created by a tax return preparation application (e.g., Intuit, Inc.'s TurboTax) configured to prepare a tax return for a user. For example, instead of the user relying entirely on an electronic filing system to perform the receiving and parsing as illustrated by blocks 200 and 210, the user may run the tax return preparation application on a computer (e.g., user computer 110) to create the data structure including the completed tax return. The tax return preparation application may send the data structure to an electronic filing system. Thus, by creating the data structure on a user computer and sending the data structure to an electronic filing system, the tax return preparation application may shift some of the workload of electronic filing from the electronic filing system to the user computer. Once the electronic filing system has received the data structure, it may proceed where the tax return preparation application left off by creating transmittable data including the completed tax return as illustrated in block 210.

As described above, taxing authorities such as taxing authority 130 typically do not accept completed tax returns that include documents of a standard document presentation format. In other words, the completed tax return transmitted from a user to an electronic filing system may not be transmitted to the taxing authority "as is." For example, if the completed tax return were a collection of PDF documents, the taxing authority may not be configured to receive a collection of PDF documents. Thus, parsing the electronic documents may include creating transmittable data that may be transmitted to a taxing authority for electronic filing. The transmittable data may be created according to a format accepted by a taxing authority such as taxing authority 130. The transmittable data may be of any format that meets the requirements for electronic filing as specified by the taxing authority in which the completed tax return is to be filed. For instance, the taxing authority may require that tax returns be submitted or transmitted according to a particular format or protocol. For example, in one embodiment, the taxing authority may require that transmittable data be an Electronic Data Interchange (EDI) document. Thus, the method described herein may include creating EDI documents according to an EDI standard. Additionally, the taxing authority may require that the transmittable data be created according to a particular EDI schema. Thus, the method disclosed herein may include creating the transmittable data according to the particular EDI schema. In another embodiment, the taxing authority may require that the transmittable data be created according to a schema of a general-purpose markup language such as an extensible markup language (XML) schema. Thus, the transmittable data may be created according to the particular language and schema (e.g., an XML schema). While the EDI and XML examples are provided for illustrative purposes, any format that is specified by the taxing authority in which the tax return is to be filed may be used. In other embodiments, the taxing authority may provide a selection of multiple electronic filing formats and thus creating the transmittable data may include selecting one of the electronic filing formats in which to create the transmittable data. In another embodiment, the taxing authority may accept only one type of electronic filing format for the electronic filing of tax returns. While the formats of each may differ, the electronic documents and the transmittable data may represent the same completed tax return. For example, the transmittable data and the completed tax return may include the same tax return information and/or data. In other words, the content of each may be the same (with the exception of any error corrections, as describe below) while the structure or formats may differ.

Block 220 illustrates that the transmittable data including the completed tax return is electronically transmitted to a taxing authority such as taxing authority 130. Additionally, the taxing authority may require that the transmittable data be transmitted according to a particular protocol for electronic filing. Thus, transmitting the transmittable data may be performed according to any of various protocols or standards specified by the taxing authority. Furthermore, the protocol or standard may correspond to the format of the transmittable data. For instance, if the transmittable data is an Electronic Data Interchange (EDI) document, transmitting the transmittable data may include transmitting and receiving the EDI documents according to an EDI standard. In another embodiment, the taxing authority may require that the transmittable data be sent as XML over the Hypertext Transfer Protocol (HTTP). Thus, the transmitting of block 220 may include transmitting the transmittable data as XML over HTTP. In some embodiments the taxing authority may provide a selection of communication protocols or standards and thus transmitting the transmittable data may include selecting one of the standards or protocols in which to transmit the transmittable data. In another embodiment, the taxing authority may accept only one type of standard or protocol for the electronic filing of tax returns. Once a standard or protocol has been selected, the transmittable data may be electronically transmitted to the taxing authority. In one embodiment, the taxing authority may provide a confirmation such as a confirmation number (e.g., a Declaration Control Number) to the electronic filing system to indicate that the transmittable data (including the completed tax return) was received. Thus, transmitting the transmittable data may include receiving the confirmation from the taxing authority.

In one embodiment, the electronic filing system may be configured to charge a user for a service including receiving the electronic documents (block 200), parsing the electronic documents (block 210) and transmitting the transmittable data to the taxing authority (block 220). In other words, the electronic filing system may be configured to provide an electronic tax return filing service to a user in exchange for a payment from the user. In other embodiments, the electronic filing service may be configured to communicate with a transaction module that is capable of charging a user for the electronic tax return filing service. In some embodiments, the transaction module may be separate from the electronic filing system.

Figure 3:
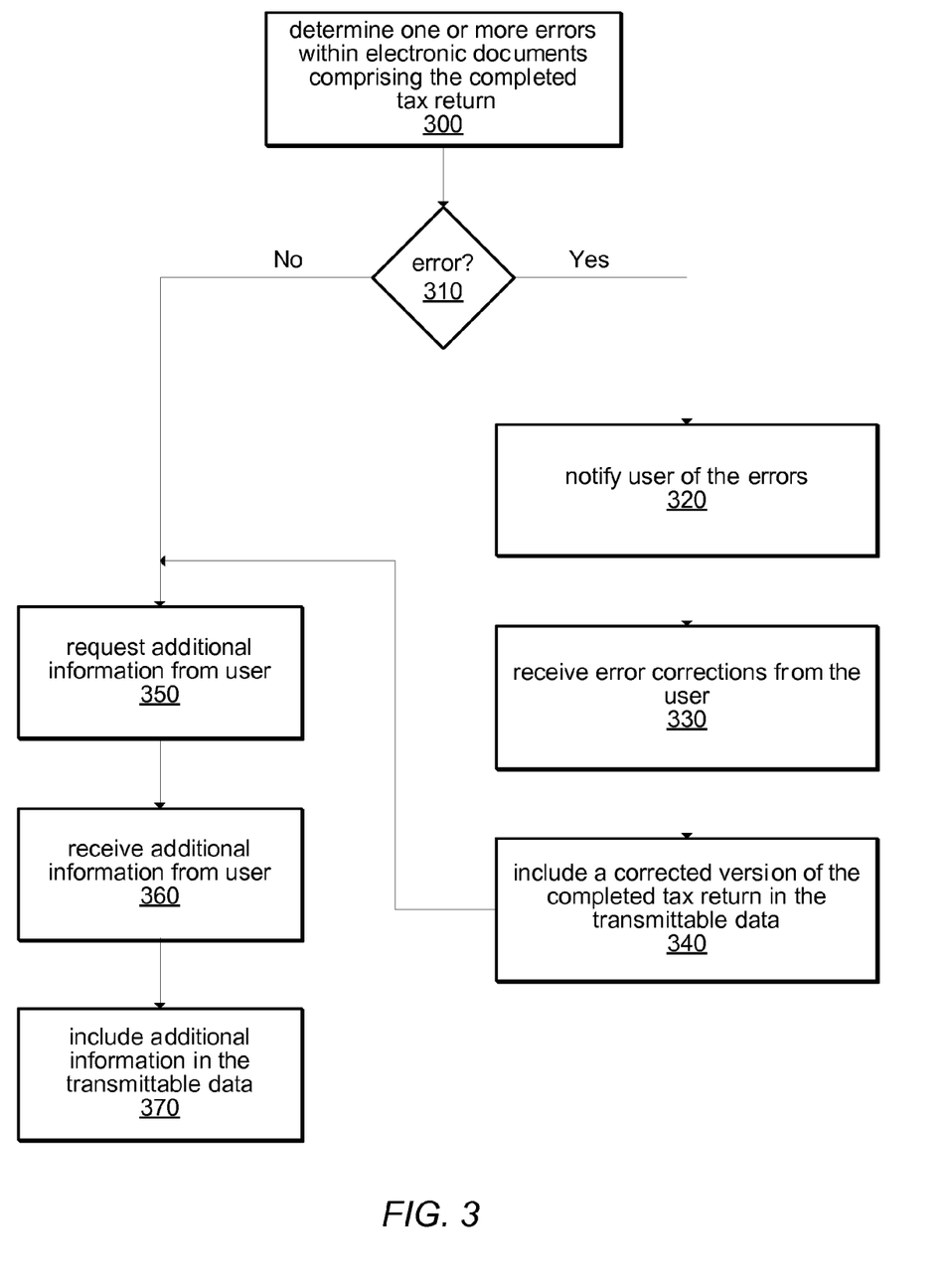
FIG. 3 is a flowchart illustrating one embodiment of a method for correcting errors and requesting additional information, as described herein.

FIG. 3 illustrates additional actions that may be performed as part of parsing the electronic documents (including one or more documents of a standard document presentation format) before the transmittable data (including the completed tax return) is sent to the taxing authority. For example, when parsing the completed tax return as illustrated in block 210 of FIG. 2, the electronic filing system may check for errors within the completed tax return as illustrated by block 300. For example, when completing a tax return form, a user (e.g., a taxpayer preparing an annual tax return) may make numerous mistakes or errors that may be detected before submitting the form to a taxing authority. Common errors may include a missing entry, mathematical error, incorrect number format or another tax return error that may be detected before electronically filing the tax return. Other detectable errors may include inconsistencies among fields. For example, a user may indicate on a tax return form that their filing status is "single" in addition to presenting an identification number (e.g., social security number) for a joint filer. Thus, the electronic filing system may detect that there is an inconsistency with either the filing status or the indication of a joint filer's identification number. Additionally, in another embodiment, the electronic filing system may detect an error caused by the user's failure to provide an form issued by a taxing authority (e.g., a wage and tax statement such as From W-2) necessary for electronic filing of a tax return with a taxing authority. Thus, the electronic filing system may send a request to the user to submit the missing form.

In one embodiment, if an error is detected (the "yes" branch of decision block 310), the electronic filing system may notify the user of the specific error. In some embodiments, the electronic filing system may notify the user by transmitting a message (e.g., an electronic mail message) to a user's computer. In another embodiment, the electronic filing system may transmit an altered version of the completed tax return to notify the user of one or more errors. The altered version of the completed tax return may include visual markings in order to draw the users attention to specific portions of the completed tax return that may contain errors. For example, a user may have failed to complete a necessary text or data field within a tax return form of the completed tax return. The user may have failed to include a home address, the name of a joint filer, or any other information necessary for the proper filing of a completed tax return with a taxing authority. For instance, if the user forgot to include their home address in a tax return form in PDF format, the altered version of completed tax return may include a visual marking on or near the field of the PDF document in which the user should have entered a correct home address. Such visual markings may include highlighting, bolding, underlining, or any other marking that would draw attention to a specific portion of a completed tax return document. In yet another embodiment, the electronic filing system may provide a user interface to notify a user of any errors present in the completed tax return. For example, the electronic filing system may provide a messaging center accessible from the user's computer (e.g. an online message center available via the Internet). The messaging center may allow the user to log in with a user name and password to view any outstanding errors of a submitted tax return. In another embodiment, the user interface may include an alert application configured to receive alerts (e.g., such as a dialog box or pop-up notification) that indicate tax return errors from the electronic filing system (e.g. through an XML feed). Thus, the user may install and run the alert application on a user computer (e.g., user computer 110) in order to receive notification of tax return errors.

In one embodiment, after a user receives notification of an error from the electronic filing system, the user may submit an error correction to electronic filing system 120. For example, an error notification may inform a user that a social security number of the tax return is 8 numbers in length and that it should be corrected to be 9 numbers in length. Thus, the user may submit a correction of the social security number to the electronic filing system instead of providing a corrected version of the entire completed tax return to the electronic filing system (e.g., by re-submitting the electronic documents). Thus, in this example, electronic filing system 120 may incorporate the error correction into the completed tax return thereby creating a corrected version of the completed tax return as shown in block 340.

In other embodiments, the user interface described above (in regard to user notification) may be capable of accepting the error corrections from a user. For example, in addition to providing error notification to the user, the user interface may be configured to receive an error correction for an error notification sent to the user. For example, the messaging center described above may enable a user to respond to any of the outstanding errors of the submitted tax return with an error correction. In one embodiment, the messaging center may be similar to an email client such that the user may receive and respond to messages stored in an inbox. In another embodiment, the alert application described above may enable the user to send a response (including an error correction) to the electronic filing system for every alert received.

If no errors are detected at decision block 310 or if the electronic filing system completes the incorporation of all error corrections as shown at block 340, the electronic filing system may request from the user additional information necessary to electronically file the tax return as shown in block 350. For example, additional information not normally required with filing a hardcopy tax return (e.g., when a user submits a tax return by mail) may be required by a taxing authority in order to file a tax return electronically. For instance, a taxing authority may require that a user submit, among other things, a personal identification number (PIN) and/or a birth date. In some embodiments, the electronic filing system may request additional information that may only be known to the user and the taxing authority. One such item may be an item from a previous year's tax return such as a user's adjusted gross income. In one embodiment, the electronic filing system may create electronic signature data from the additional information (e.g., an adjusted gross income) and include the electronic signature data in transmittable data to be transmitted to the taxing authority. For example, when a user files a hardcopy tax return (e.g., submitting a tax return by mail), the tax return may include the handwritten signature of the user. Thus, when filing a tax return electronically, it may be necessary to provide an electronic signature created with secure information known to the user and the taxing authority.

In other embodiments, the additional information requested might be information from a form that would typically accompany a hardcopy tax return form (e.g., when a user submits a tax return by mail). For example, if submitting a hardcopy tax return, a user may include in the submission a completed tax return form (e.g., Form 1040) along with various supplemental documents such as a wage and tax statement (e.g., Form W-2), an interest income statement (e.g., Form 1099-INT), or any other form necessary for the completion of a tax return other than the tax return form. Thus, when filing a tax return electronically, a user may have to provide the information included in such forms. In one embodiment, a user interface of the electronic filing system may request from a user additional information such as information from a form that would typically accompany a hardcopy tax return form as described above. In response, the user may submit an electronic version of the request form. The electronic version of the requested form may be created by scanning the hardcopy form to create an electronic document such as a PDF file or an image file. In some embodiments, after receiving the additional information from the user as illustrated by block 360, the electronic filing system may utilize optical character recognition (OCR) to extract data and/or information from the additional information. In other embodiments, a user interface of the electronic filing system may request specific information pertaining to the supplemental documents as described above. For instance, the user interface may prompt the user to enter information such as an employer identification number, wages, or income tax withheld from an appropriate form (e.g., Form W-2). In other words, the user interface may provide a user with a series of prompts pertaining to information in supplementary documents and receive responses to each prompt from the user. In some embodiments, after receiving the additional information from the user as illustrated by block 360, a user interface of the electronic filing system may enable a user to review and correct any information submitted to the electronic filing system. For example, if a user responds to a prompt by submitting an employer identification number to the electronic filing system, the user interface may allow the user to review the information submitted for errors (e.g., typographical or formatting errors). If a user submitted an entire document, such as an electronic version of a supplementary form as described above, the user may review the entire document for errors by viewing the document as submitted (e.g., an image of the document).

Figure 4:
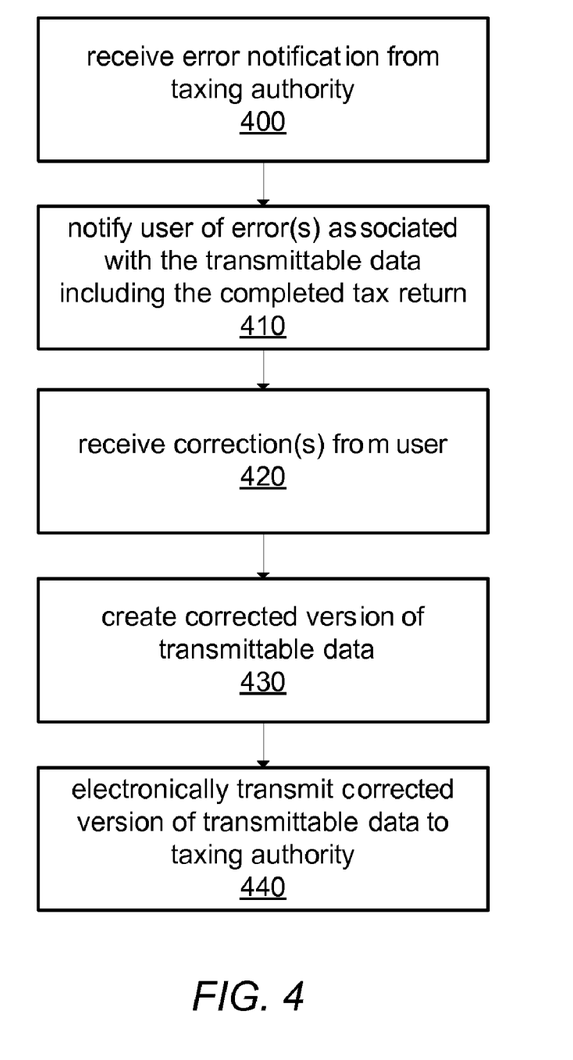
FIG. 4 is a flowchart illustrating one embodiment of a method for correcting errors detected by a taxing authority, as described herein.

As described above, the electronic filing system may check for errors within completed tax return 112. However, some errors may not be detectable by electronic filing system 120. For example, a user may have included in completed tax return 112 an incorrect social security number of the correct format (e.g., a sequence of nine single digit numbers). Thus, electronic filing system 120 may detect that the social security number is of the correct format without detecting that the social security number is incorrect for the particular user. The above example applies similarly to information and/or data other than a social security number (e.g., an adjusted gross income). In other words, in addition to the errors described in regard to FIG. 3, the taxing authority may check for errors that it may only be capable of detecting. Thus, there may be some redundancy in the error checking of the electronic filing system and the taxing authority. FIG. 4. illustrates one embodiment of a method for correcting errors detected by a taxing authority, as described herein. Additionally, the method of FIG. 4 may be performed by the electronic filing service 120 of FIG. 1.

The electronic filing system may receive an error notification (as illustrated by block 400) from the taxing authority. The error notification may correspond to a particular error of the tax return (e.g., an incorrect address or identification number). Additionally, the electronic filing system may receive the error notification from the taxing authority via any method of transmitting data or information over network 101. In some embodiments, the error notification may be sent from the taxing authority to the electronic filing system in the same manner that the transmittable data was transmitted for electronic filing. For example, if the transmittable data was sent to the taxing authority as XML over HTTP, the error notification may be sent to the electronic filing system as XML over HTTP. In another embodiment, the electronic filing system may provide a list of standards or protocols in which error notifications from the taxing authority may be sent. Thus, the taxing authority may select one of the standards or protocols and transmit the error notification to the electronic filing system accordingly.

After receiving an error notification from the taxing authority, electronic filing system may interpret the notification and notify the user of the error(s) within the transmitted tax return accordingly as illustrated by block 410. The electronic filing system may notify the user of an error via any of the various techniques described in the description of FIG. 3. For example, a messaging center, alert application, or any other notification technique described above in regard to FIG. 3 may be utilized. Additionally, the user may provide a correction to the electronic filing system in response to an error notification by any of the various techniques described in FIG. 3 such as by utilizing the messaging center or alert application. Subsequently, the electronic filing system may receive the correction as illustrated by block 420 via any of the techniques described above in regard to FIG. 3.

In response to receiving correction(s) from the user, the electronic filing system may create a corrected version of the transmittable data by incorporating the corrections into the transmittable data as illustrated by block 430. The correction(s) received may be corrections to the completed tax return, and thus the corrected version of the transmittable data may include a corrected version of the completed tax return. The corrected version of the transmittable data may be created as before (e.g., block 210 of FIG. 2) with the exception that the transmittable data includes the appropriate corrections as indicated by the user. Additionally, the correction(s) received may be corrections to additional information (e.g., a PIN number or date of birth), and thus the corrected version of the transmittable data may include a corrected version of the additional information.

After the corrections are incorporated into transmittable data to create a corrected version of the transmittable data, the electronic filing system may transmit the corrected version of the transmittable data to the taxing authority as illustrated in block 440. Transmitting the corrected version of the transmittable data may be performed via any of the techniques described above in regard to block 220 of FIG. 2. For example, the transmittable data may be transmitted according to a particular EDI standard or protocol. The method of FIG. 4 may be repeated for the corrected version of the transmittable data if necessary (e.g., if the user submits an incorrect correction).

Although the above description has been given in terms of electronically filing a tax return with a taxing authority, the system and methods described herein may also apply to electronic filing required by other agencies (e.g., services, authorities or other agencies, governmental or otherwise), such as for electronically filing statements including, e.g., payroll data, financial statements or a Securities and Exchange Commission (SEC) compliance statement. Additionally, while the above methods described herein have been given in terms of an electronic filing system, the description is not intended to limit the performing of the methods to an electronic filing system.

Furthermore, although the above description presents the various entities of FIG. 1 as single entities, one or more of the entities may be distributed in nature. In other words, the functionality of each entity may be distributed across multiple systems or devices. For example, the functions of the electronic filing system may be partially completed on an application server(s) while other functions of the electronic filing system may be completed on a data server(s) or mainframe computer(s) separate from the application server. In further example, the functionality of the user computer may be distributed across multiple devices such as a desktop computer and a handheld device.

Figure 5:
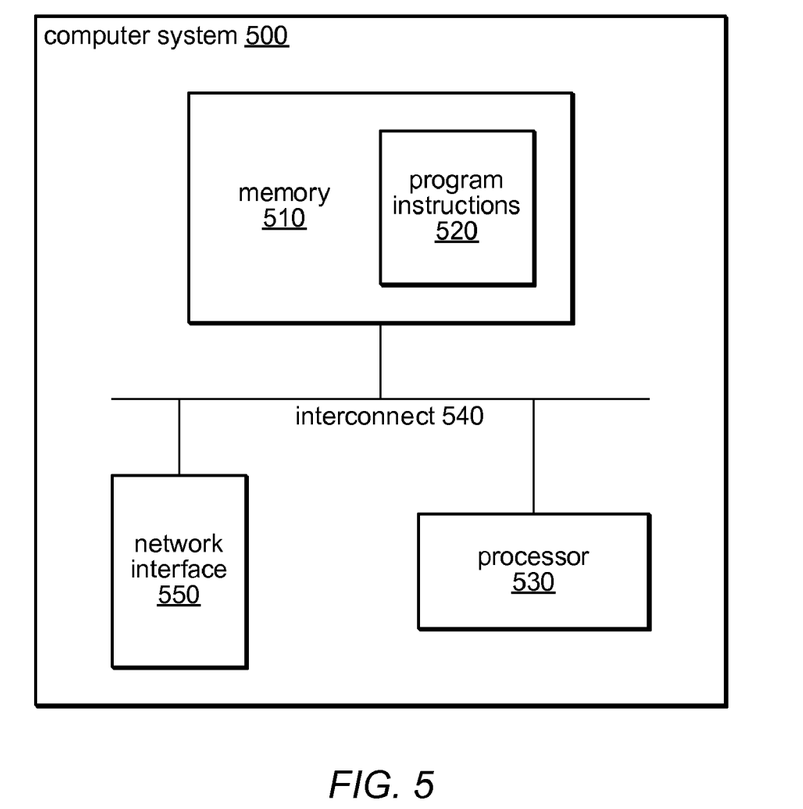
FIG. 5 illustrates a computing system capable of implementing an electronic filing system, according to one embodiment, as described herein.

Electronic filing system 120 may execute on various types of computer systems. FIG. 5 illustrates a computing system capable of implementing an electronic filing system, such as electronic filing system 120, as described herein and according to various embodiments. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device.

The electronic filing system described herein may be provided as a computer program product, or software, that may include a computer-readable storage medium having stored thereon instructions, which may be used to program a computer system (or other electronic devices) to implement an electronic filing system as described herein. A computer-readable storage medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

A computer system 500 may include a processor unit 530 (possibly including multiple processors, a single threaded processor, a multi-threaded processor, a multi-core processor, or other type of processor). The computer system 500 may also include one or more system memories 510 (e.g., one or more of cache, SRAM DRAM, RDRAM, EDO RAM, DDR RAM, SDRAM, Rambus RAM, EEPROM, or other memory type), an interconnect 540 (e.g., a system bus, LDT, PCI, ISA, or other bus type), and a network interface 550 (e.g., an ATM interface, an Ethernet interface, a Frame Relay interface, or other interface). The memory medium 510 may include other types of memory as well, or combinations thereof. Embodiments of the electronic filing system described herein may include fewer or additional components not illustrated in FIG. 5 (e.g., video cards, audio cards, storage devices, additional network interfaces, peripheral devices, or other components). The processor unit 530, the network interface 550, and the system memory 510 may be coupled to the interconnect 540. It should also be noted that one or more components of system 500 might be located remotely and accessed via a network. One or more of the system memories 510 may embody an electronic filing system 120.

Network interface 540 may be configured to enable computer system 500 to communicate with other computers, systems or machines, such as across network 101, described above. Network 101 may enable data communication between computer system 500 and among other entities illustrated in FIG. 1, such as user computer 110, taxing authority 130, user computer 140, and preparation server 150, described above. Computer system 500 is representative of the type of device that may be used to implement these devices (the other entities of FIG. 1) as well. Network interface 540 may use standard communications technologies and/or protocols. Network 101 may include, and network interface 540 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 101 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 101 by network interface 550 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 510 may include program instructions configured to implement an electronic filing system 120, as described herein. Electronic filing system 120 may be implemented in any of various programming languages or methods. For example, in one embodiment, electronic filing system 120 may be JAVA based, while in another embodiments, it may be implemented using the C or C++ programming languages or other programming languages.

While the electronic filing system has been described herein with reference to various embodiments, it will be understood that these embodiments are illustrative and that the scope of the electronic filing system is not limited to them. Many variations, modifications, additions, and improvements are possible. More generally, the present electronic filing system is described in the context of particular embodiments. For example, the blocks and logic units identified in the description are for ease of understanding and not meant to limit the electronic filing system to any particular embodiment. Functionality may be separated or combined in blocks differently in various realizations or described with different terminology. Please also note that in reference to the methods illustrated by FIGS. 2-4, the various actions and functionality described herein regarding those respective methods may be performed in different orders and the respective method may be implement using a different number of actions than illustrated in FIGS. 2-4.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the electronic filing system as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
receiving, from a taxpayer computer, a first one or more taxpayer-generated Portable Document Format (PDF) files comprising all necessary taxpayer information required by a taxing authority for filing a tax return for a taxpayer with the taxing authority,
wherein each one of the first one or more taxpayer-generated PDF files complies with a format for non-electronic filing accepted by the taxing authority;
parsing, by an electronic filing system executing on a computer system, the first one or more taxpayer-generated PDF files;
determining, based on the parsing the first one or more taxpayer-generated PDF files, that the first one or more taxpayer-generated PDF files comprises one or more errors, wherein the one or more errors relate to the necessary taxpayer information;
notifying by the electronic filing system in response to the determining, the taxpayer of the one or more errors;
receiving, by the electronic filing system in response to the notifying, a second one or more taxpayer generated PDF files not comprising the one or more errors;
parsing the second one or more taxpayer-generated PDF files;
obtaining, in response to the parsing the second one or more taxpayer-generated PDF files, transmittable data configured for acceptance by the taxing authority for electronic filing of tax returns,
wherein the transmittable data comprises a completed tax return for the taxpayer,
wherein the transmittable data is in a format different than PDF; and
electronically transmitting, by the electronic filing system, the transmittable data to the taxing authority.

2. The computer-implemented method of claim 1, wherein the parsing the second one or more taxpayer-generated PDF files further comprises:
   receiving one or more corrections associated with the one or more errors,
   wherein said transmittable data comprises the one or more corrections.

3. The computer-implemented method of claim 1, wherein said notifying said taxpayer comprises altering the first one or more taxpayer-generated PDF files by visually marking one or more fields that contain the first one or more errors and subsequently providing the altered first one or more taxpayer-generated PDF files to the taxpayer.

4. The computer-implemented method of claim 1, wherein the first one or more taxpayer-generated PDF files comprise one or more image files, wherein said parsing the first one or more taxpayer-generated PDF files comprises extracting data from the one or more image files, wherein said extracting comprises optical character recognition.

5. The computer-implemented method of claim 1, further comprising, subsequent to said electronically transmitting the transmittable data to the taxing authority:
   receiving a notification of a subsequent one or more errors from said taxing authority;
   notifying said taxpayer of the subsequent one or more errors;
   receiving one or more corrections associated with the subsequent one or more errors;
   in response to receiving the one or more corrections, creating a corrected version of the transmittable data; and
   electronically transmitting the corrected version of the transmittable data to the taxing authority in the format different than PDF and according to the configuration accepted by the taxing authority.

6. The computer-implemented method of claim 1, wherein said receiving comprises receiving the first one or more taxpayer-generated PDF files through the internet.

7. The computer-implemented method of claim 6, further comprising a preparation service creating the completed tax return prior to said receiving the first one or more taxpayer-generated PDF files wherein the preparation service is separate from said electronic filing system.

8. The computer-implemented method of claim 1, further comprising charging the taxpayer in response to said electronically transmitting.

9. The computer-implemented method of claim 1, further comprising receiving additional information from the taxpayer for generating electronic signature data, wherein said additional information is not comprised within said first one or more taxpayer-generated PDF files wherein said electronically transmitting comprises sending the electronic signature data to the taxing authority.

10. The computer-implemented method of claim 1, wherein said parsing the first one or more taxpayer-generated PDF files comprises creating a data structure of a format associated with a tax return preparation application.

11. A system, comprising:
   a processor; and
   a memory coupled to the processor, wherein the memory comprises program instructions executable by the processor to:
      receive, from a taxpayer computer, a first one or more taxpayer-generated Portable Document Format (PDF), wherein the one or more taxpayer-generated PDF files comprise all necessary taxpayer information required by a taxing authority for filing a tax return for the taxpayer with the taxing authority,
         wherein each one of the first one or more taxpayer-generated PDF files complies with a format for non-electronic filing accepted by the taxing authority;
      parse the first one or more taxpayer-generated PDF files;
      determine, based on the parsing the first one or more taxpayer-generated PDF files, that the first one or more taxpayer-generated PDF files comprises one or more errors, wherein the one or more errors relate to the necessary taxpayer information;
      notify, in response to the determining, the taxpayer of the one or more errors;
      receive, in response to the notifying, a second one or more taxpayer generated PDF files not comprising the one or more errors;
      parse the second one or more taxpayer-generated PDF files;
      obtain, in response to the parsing the second one more taxpayer-generated PDF files, transmittable data configured for by the taxing authority for electronic filing of tax returns,
         wherein the transmittable data comprises a completed tax return for the taxpayer,
         wherein the transmittable data is in a format different than PDF; and
      electronically transmit, by the electronic filing system, the transmittable data to the taxing authority in the different format and according to the configuration accepted by the taxing authority.

12. The system of claim 11, wherein to parse the first one or more taxpayer-generated PDF documents further comprises:
   receiving one or more corrections associated with the one or more errors,
   wherein said transmittable data comprises the one or more corrections.

13. The system of claim 11, wherein to notify said taxpayer comprises altering the first one or more taxpayer-generated PDF files by visually marking one or more fields that contain the first one or more errors and subsequently providing the altered first one or more taxpayer-generated PDF files to the taxpayer.

14. The system of claim 11, wherein the one or more taxpayer-generated PDF files comprise one or more image files, wherein to parse the first one or more taxpayer-generated PDF files comprises extracting data from the one or more image files, wherein said extracting comprises optical character recognition.

15. The system of claim 11, wherein the program instructions are further configured to, subsequent to said electronically transmitting the transmittable data to the taxing authority:
   receive a notification of a subsequent one or more errors from said taxing authority;
   notify said taxpayer of the subsequent one or more errors;
   receive one or more corrections associated with the subsequent one or more errors;
   in response to receiving the one or more corrections, create a corrected version of the transmittable data; and
   electronically transmit the corrected version of the transmittable data to the taxing authority in the different format and according to the configuration accepted by the taxing authority.

16. The system of claim 11, wherein the system further comprises an electronic filing system, wherein the electronic filing system is configured to execute the program instructions comprised within the memory, wherein said receiving the first one or more taxpayer-generated PDF files comprises receiving the first one or more taxpayer-generated PDF files through the internet.

17. The system of claim 16, further comprising a preparation service configured to create the completed tax return prior to said receiving the first one or more taxpayer-generated PDF files, wherein the preparation service is separate from said electronic filing system.

18. The system of claim 11, wherein the program instructions are further configured to charge the taxpayer in response to said electronically transmitting.

19. The system of claim 11, wherein the program instructions are further configured to receive additional information from the taxpayer for generating electronic signature data, wherein said additional information is not comprised within said first one or more taxpayer-generated PDF files, wherein said electronically transmitting comprises sending the electronic signature data to the taxing authority.

20. The system of claim 11, wherein said receiving the first one or more taxpayer-generated PDF files is performed by a tax return preparation application, wherein said parsing the first one or more taxpayer-generated PDF files is at least partially performed by the tax return preparation application, wherein said parsing the first one or more taxpayer-generated PDF files comprises creating a data structure of a format associated with the tax return preparation application.

21. A computer-readable storage medium comprising stored computer-executable program instructions to implement:
   receiving, from a taxpayer computer, a first one or more taxpayer-generated Portable Document Format (PDF) files comprising all necessary taxpayer information required by a taxing authority for filing a tax return for a taxpayer with the taxing authority,
      wherein each one of the first one or more taxpayer-generated PDF files complies with a format for non-electronic filing accepted by the taxing authority;
   parsing, by an electronic filing system executing on a computer system, the first one or more taxpayer-generated PDF files;
   determining, based on the parsing the first one or more taxpayer-generated PDF files, that the first one or more taxpayer-generated PDF files comprises one or more errors,
      wherein the one or more errors relate to the necessary taxpayer information;
   notifying by the electronic filing system in response to the determining, the taxpayer of the one or more errors;
   receiving, by the electronic filing system in response to the notifying, a second one or more taxpayer generated PDF files not comprising the one or more errors;
   parsing the second one or more taxpayer-generated PDF files;
   obtaining, in response to the parsing the second one or more taxpayer-generated PDF files, transmittable data configured for acceptance by the taxing authority for electronic filing of tax returns,
      wherein the transmittable data comprises a completed tax return for the taxpayer,
      wherein the transmittable data is in a format different than PDF; and
   electronically transmitting, by the electronic filing system, the transmittable data to the taxing authority in the format different than PDF and according to the configuration accepted by the taxing authority.

22. The medium of claim 21, wherein said parsing the second one or more taxpayer-generated PDF files further comprises:
   receiving one or more corrections associated with the one or more errors,
   wherein said transmittable data comprises the one or more corrections.

23. The medium of claim 21, wherein said notifying said taxpayer comprises altering the first one or more taxpayer-generated PDF files by visually marking one or more fields that contain the first one or more errors and subsequently providing the altered first one or more taxpayer-generated PDF files to the taxpayer.

24. The medium of claim 21, wherein the first one or more taxpayer-generated PDF files comprise one or more image files wherein said parsing the first one or more taxpayer-generated PDF files comprises extracting data from the one or more image files, wherein said extracting comprises optical character recognition.

25. The medium of claim 21, wherein the program instructions are further executable to implement, subsequent to said electronically transmitting the transmittable data to the taxing authority:
   receiving a notification of a subsequent one or more errors from said taxing authority;
   notifying said taxpayer of the subsequent one or more errors;
   receiving one or more corrections associated with the subsequent one or more errors;
   in response to receiving the one or more corrections, creating a corrected version of the transmittable data; and
   electronically transmitting the corrected version of the transmittable data to the taxing authority in a format different than PDF and according to the configuration accepted by the taxing authority.

26. The medium of claim 21, wherein said receiving comprises receiving the first one or more taxpayer-generated PDF files through the internet.

27. The medium of claim 26, wherein the program instructions are further executable to implement a preparation service creating the completed tax return prior to said receiving the first one or more taxpayer-generated PDF files, wherein the preparation service is separate from said electronic filing system.

28. The medium of claim 21, wherein the program instructions are further executable to implement charging the taxpayer in response to said electronically transmitting.

29. The medium of claim 21, wherein the program instructions are further executable to implement receiving additional information from the taxpayer for generating electronic signature data, wherein said additional information is not comprised within said first one or more taxpayer-generated PDF files, wherein said electronically transmitting comprises sending the electronic signature data to the taxing authority.

30. The medium of claim 21, wherein said parsing the first one or more taxpayer-generated PDF files comprises creating a data structure of a format associated with a tax return preparation application.

31. A computer-implemented method, comprising:
   receiving, from a taxpayer computer, a first one or more taxpayer-generated Portable Document Format (PDF) files comprising all necessary taxpayer information required by a particular agency for filing a statement for a taxpayer with the particular agency,
      wherein each one of the one or more taxpayer-generated PDF files electronic complies with a format for non-electronic submission to the particular agency;

parsing, by an electronic filing system executing on a computer system, the first one or more taxpayer-generated PDF files;

determining, based on the parsing the first one or more taxpayer-generated PDF files, that the first one or more taxpayer-generated PDF files comprises one or more errors,
  wherein the one or more errors relate to the necessary taxpayer information;

notifying by the electronic filing system in response to the determining, the taxpayer of the one or more errors;

receiving, by the electronic filing system in response to the notifying, a second one or more taxpayer generated PDF files not comprising the one or more errors; parsing the second one or more taxpayer-generated PDF files, obtaining, in response to the parsing the second one or more taxpayer-generated PDF files, transmittable data configured for acceptance by the particular agency for electronic filing of statements,
  wherein the transmittable data comprises a completed statement for the taxpayer,
  wherein the transmittable data is in a format different than PDF; and electronically transmitting, by the electronic filing system, the transmittable data to the particular agency.

32. The computer-implemented method of claim 31, wherein the parsing the second one or more taxpayer-generated PDF files further comprises:

receiving one or more corrections associated with the one or more errors,
wherein said transmittable data comprises the one or more corrections.

33. The computer-implemented method of claim 31, further comprising, subsequent to said electronically transmitting the transmittable data to the particular agency:
  receiving a notification of a subsequent one or more errors from said agency;
  notifying said taxpayer of the subsequent one or more errors;
  receiving one or more corrections associated with the subsequent one or more errors;
  in response to receiving the one or more corrections, creating a corrected version of the transmittable data; and
  electronically transmitting the corrected version of the transmittable data to the particular agency in the format different than PDF and according to the configuration accepted by the particular agency.

34. The computer-implemented method of claim 31, further comprising receiving additional information from the taxpayer for generating electronic signature data, wherein said additional information is not comprised within said first one or more taxpayer-generated PDF files, wherein said electronically transmitting comprises sending the electronic signature data to the particular agency.

* * * * *

UNITED STATES PATENT AND TRADEMARK OFFICE
CERTIFICATE OF CORRECTION

PATENT NO. : 8,156,018 B1
APPLICATION NO. : 11/612253
DATED : April 10, 2012
INVENTOR(S) : Christopher Neil Quinn et al.

Page 1 of 1

It is certified that error appears in the above-identified patent and that said Letters Patent is hereby corrected as shown below:

In the claims:

- In Claim 11, Column 17 (line 64), --files-- should be added after "(PDF)".

- In Claim 11, Column 18 (line 20), --acceptance-- should be added after "for".

- In Claim 12, Column 18 (line 32), --files-- should be added after "(PDF)".

- In Claim 12, Column 18 (line 32), "documents" should be deleted.

Signed and Sealed this
Fifth Day of June, 2012

David J. Kappos
*Director of the United States Patent and Trademark Office*